(12) United States Patent
Narita

(10) Patent No.: US 8,963,867 B2
(45) Date of Patent: Feb. 24, 2015

(54) DISPLAY DEVICE AND DISPLAY METHOD

(71) Applicant: Panasonic Corporation, Osaka (JP)

(72) Inventor: Atsushi Narita, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 176 days.

(21) Appl. No.: 13/793,484

(22) Filed: Mar. 11, 2013

(65) Prior Publication Data

US 2013/0194178 A1     Aug. 1, 2013

Related U.S. Application Data

(63) Continuation of application No. PCT/JP2012/003961, filed on Jun. 18, 2012.

(30) Foreign Application Priority Data

Jan. 27, 2012    (JP) ................................ 2012-015183

(51) Int. Cl.
    *G06F 3/0488*       (2013.01)
    *G09G 5/32*         (2006.01)
    *G09G 5/14*         (2006.01)

(52) U.S. Cl.
    CPC .. *G09G 5/32* (2013.01); *G09G 5/14* (2013.01); *G06F 3/0488* (2013.01); *G09G 2354/00* (2013.01); *G06F 2203/04803* (2013.01)
    USPC ........................................................ 345/173

(58) Field of Classification Search
    USPC ................................................. 345/173–179
    See application file for complete search history.

(56) References Cited

U.S. PATENT DOCUMENTS

| 6,958,749 B1 | 10/2005 | Matsushita et al. |
| 7,773,075 B2 | 8/2010 | Otsuka et al. |
| 2007/0222769 A1 | 9/2007 | Otsuka et al. |
| 2009/0085881 A1* | 4/2009 | Keam ............................ 345/173 |

(Continued)

FOREIGN PATENT DOCUMENTS

| JP | 09-134270 A | 5/1997 |
| JP | 2001-134382 A | 5/2001 |

(Continued)

OTHER PUBLICATIONS

International Search Report issued in International Patent Application No. PCT/JP2012/003961 dated Sep. 18, 2012.

*Primary Examiner* — Kevin M Nguyen
*Assistant Examiner* — Cory Almeida
(74) *Attorney, Agent, or Firm* — McDermott, Will & Emery LLP

(57) ABSTRACT

A display device including a display unit that displays an image; an operation detection unit that detects designated positions on the display unit respectively designated by two or more fingers of an operator; an operation analysis unit that determines, when the operation detection unit detects that the designated positions are moving in parallel in a first region of the display unit, a position of a second region newly generated in the first region and a display direction of an image displayed in the second region, based on the designated positions and a direction of movement of the designated positions; and a display control unit that controls the display unit to display an image in the second region, according to the position of the second region and the display direction of the image displayed in the second region determined by the operation analysis unit.

11 Claims, 14 Drawing Sheets

(56) References Cited

U.S. PATENT DOCUMENTS

| | | | |
|---|---|---|---|
| 2010/0083109 A1* | 4/2010 | Tse et al. | 715/702 |
| 2010/0083111 A1* | 4/2010 | de los Reyes | 715/702 |
| 2010/0097338 A1 | 4/2010 | Miyashita et al. | |
| 2010/0177042 A1 | 7/2010 | Chen | |
| 2011/0107272 A1 | 5/2011 | Aguilar | |

FOREIGN PATENT DOCUMENTS

| | | |
|---|---|---|
| JP | 2007-241410 A | 9/2007 |
| JP | 2007-257220 A | 10/2007 |
| JP | 2008-269044 A | 11/2008 |
| JP | 2010-097473 A | 4/2010 |
| JP | 2010-160773 A | 7/2010 |

* cited by examiner

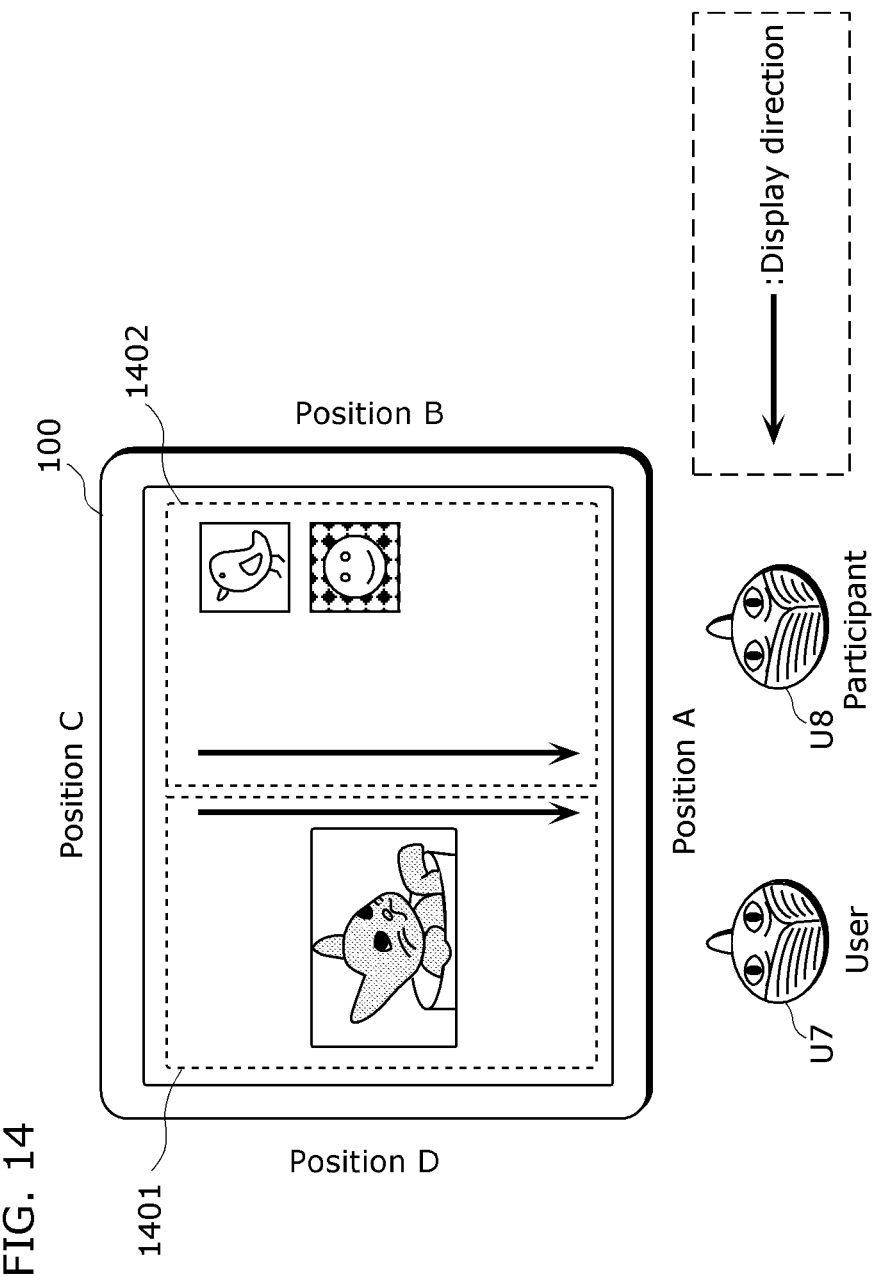

DISPLAY DEVICE AND DISPLAY METHOD

CROSS REFERENCE TO RELATED APPLICATION

This is a continuation application of PCT International Application No. PCT/JP2012/003961 filed on Jun. 18, 2012, designating the United States of America, which is based on and claims priority of Japanese Patent Application No. 2012-015183 filed on Jan. 27, 2012. The entire disclosures of the above-identified applications, including the specifications, drawings and claims are incorporated herein by reference in their entirety.

FIELD

The present disclosure relates to a display device and a display method.

BACKGROUND

A known conventional display device including a display splits the display screen by an intuitive operation through movement of a finger on the surface of the display, and displays different screens on the split regions (for example, Patent Literature (PTL) 1).

According to the technique disclosed in PTL 1, dragging an icon displayed on the display screen in a predetermined direction with a finger causes the display screen to be split based on that direction and allows different images to be displayed on the split display regions, thus making it possible to perform screen splitting by an intuitive operation such as a finger movement.

CITATION LIST

Patent Literature

[PTL 1] Japanese Unexamined Patent Application Publication No. 9-134270

SUMMARY

Technical Problem

However, such a screen splitting operation according to the conventional technology has a problem in that the operator has to perform an additional operation for changing the display direction of the screen when the display orientation of the split screen is different from the direction intended by the operator.

The present disclosure has been made in order to solve the above-described problem, and provides a display device and the like that orients a display region newly created by a screen splitting operation in the direction in which an operator is located.

Solution to Problem

A display device according to an aspect of the present disclosure includes: a display unit configured to display an image; an operation detection unit configured to detect designated positions on the display unit that are respectively designated by two or more fingers of an operator; an operation analysis unit configured to determine, when the operation detection unit detects that the designated positions are moving in parallel in a first region of the display unit, a position of a second region newly generated in the first region and a display direction of an image displayed in the second region, based on the designated positions and a direction of movement of the designated positions; and a display control unit configured to control the display unit to display an image in the second region, according to the position of the second region and the display direction of the image displayed in the second region determined by the operation analysis unit.

These general and specific aspects may be implemented using a system, a method, an integrated circuit, a computer program, or a computer-readable recording medium such as a CD-ROM, or any combination of systems, methods, integrated circuits, computer programs, and computer-readable recording media.

Advantageous Effects

A display device according to the present disclosure makes it possible to match the orientation of display of a split screen with the orientation in which the operator is located by means of an intuitive screen splitting operation.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 14 shows another example of the display device after screen splitting according to Embodiment 3.

Figure 1:
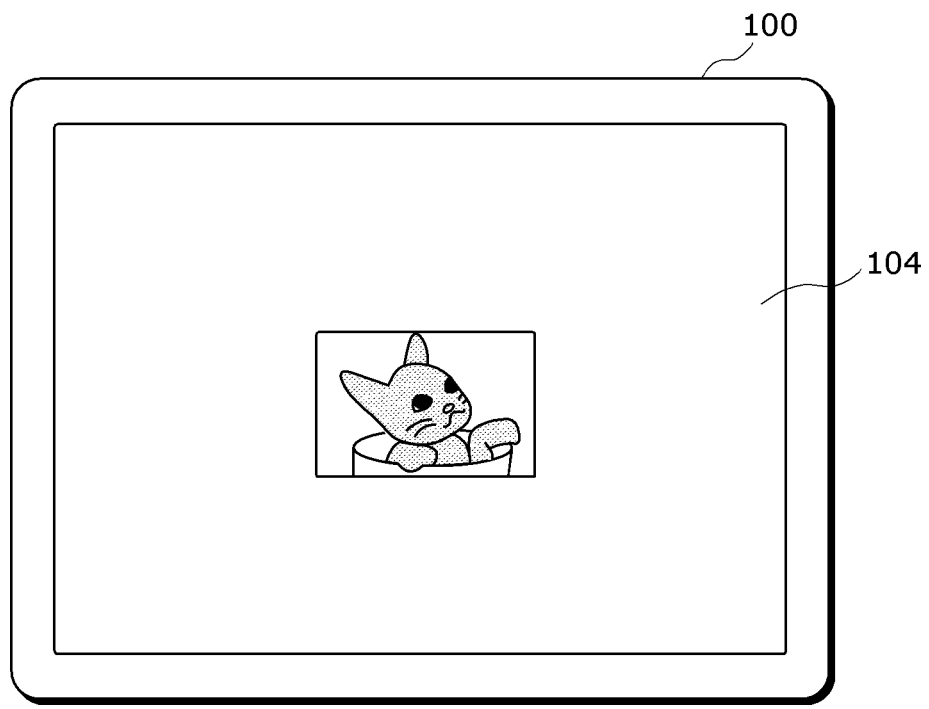
FIG. 1 is a front view showing an example of the external configuration of a display device according to Embodiment 1.

DESCRIPTION OF EMBODIMENTS (Findings on which the Present Disclosure is Based)

The inventor has found that the following problem arises in relation to the display device described in the "Background" section.

The conventional technique disclosed in PTL 1 enables intuitive screen splitting using a finger, but does not provide control of the screen display direction after screen splitting. For example, when the screen is intended to be shared by multiple people, images displayed in the regions after screen splitting may not be directed in an appropriate orientation. In this case, settings such as for changing the screen display direction after the screen is split need to be configured by the operator.

The present disclosure has been made in order to solve the above-described problem, and provides a display device and the like that orients a display region newly created by a screen splitting operation in the direction in which an operator is located.

A display device according to an aspect of the present disclosure includes: a display unit configured to display an image; an operation detection unit configured to detect designated positions on the display unit that are respectively designated by two or more fingers of an operator; an operation analysis unit configured to determine, when the operation detection unit detects that the designated positions are moving in parallel in a first region of the display unit, a position of a second region newly generated in the first region and a display direction of an image displayed in the second region, based on the designated positions and a direction of movement of the designated positions; and a display control unit configured to control the display unit to display an image in the second region, according to the position of the second region and the display direction of the image displayed in the second region determined by the operation analysis unit.

With this configuration, a new operator wanting to use a display device can generate a new display region (second region) in the display region (first region) of that display device through an operation using two or more of his or her fingers. At that time, the display device can direct the orientation of display of the new display region to the direction in which the operator is located, based on the relative positional relationship created between the designated positions by the difference in length of the fingers of the operator and the direction of movement of the designated positions. Accordingly, it is possible to direct the orientation of the display region newly created by the screen splitting operation to the direction in which the operator is located, without a setting or the like of the screen display direction.

For example, the operation analysis unit may be configured to, based on a direction of arrangement and the direction of movement of the designated positions, estimate a direction in which the operator is located as seen from the display device, and determine the direction as the display direction of the image displayed in the second region.

With this configuration, the display device, based on the direction of arrangement of the contact positions and the direction of movement of two or more fingers of a new operator wanting to use a display device in an operation performed by the operator, estimates the direction in which the operator is located. Then, the display device determines the display direction of the new display region (second region) so as to be oriented naturally when the display device is used by the operator located in the estimated direction. Accordingly, it is possible to direct the display region newly created by the screen splitting operation to the direction in which the operator is located.

For example, the operation analysis unit may be configured to, based on a direction of arrangement and the direction of movement of the designated positions, estimate a direction in which the operator is located as seen from the display device, and determine, as the position of the second region, whichever of the regions formed by the first region being split by a line corresponding to a trajectory of the designated positions is closest to the operator.

With this configuration, the operator can use, as his or her own display region, the display region that he or she is closest to out of the display regions formed after performing a splitting operation. Accordingly, the display region newly created by the screen splitting operation is formed close to the operator, and the operator can use the display region without performing any additional operation such as positional adjustment.

For example, the display control unit may be configured to display an image displayed in the first region, in a third region that is located within the first region and is not included in the second region, and to display an image for the operator in the second region.

With this configuration, the operation screen for a new operator can be displayed in a new display region (second region) formed close to the new operator. Furthermore, displaying the content that was displayed on the display device (first region) in a region (third region) close to the user that remains after the formation of the new display region allows the user to continue to view his or her own display content in proximity to where he or she is located. Accordingly, the user and the new operator can view their own display regions after the formation of the new display region.

For example, the display control unit may be configured to determine a direction matching the display direction of the image displayed in the first region as a display direction of the image displayed in the third region.

With this configuration, a user is able to continue to use, in the same display direction, the display content that he or she caused the display device (first region) to display before a new operator appears, with the display direction unchanged. Accordingly, the user can continue to use his or her own display region even after the formation of the new display region.

For example, the display control unit may be configured to display, in at least one of the second region and the third region, the image displayed in the first region.

With this configuration, the display content displayed in the display device (first region) by a user before a new operator appears can be displayed in a region (third region) close to the user after a splitting operation is performed. Additionally, the display content displayed in the display device (first region) by a user before a new operator appears can be displayed in a region (second region) close to the new operator after a splitting operation is performed. One of these methods may be used depending on the selection by the user and the new operator.

For example, the operation analysis unit may be configured to, when it is detected that the two designated positions are moving in parallel in the first region, determine a position of the second region and a display direction of an image displayed in the second region, based on the two designated positions and a direction of arrangement and the direction of movement of the two designated positions.

With this configuration, the screen splitting and the determination of the display direction of an image on a new screen can be performed by an operation performed by parallel movement of two fingers of the operator.

A display method according to an aspect of the present disclosure includes a display unit configured to display an image, the method including: detecting designated positions on the display unit that are respectively designated by two or more fingers of an operator; determining, when it is detected in the detecting that the designated positions are moving in parallel in a first region of the display unit, a position of a second region newly generated in the first region and a display direction of an image displayed in the second region, based on the designated positions and a direction of movement of the designated positions; and controlling the display unit to display an image in the second region, according to the position of the second region and the display direction of the image displayed in the second region determined in the determining.

Thereby, the above-described display method has the same effect as the above-described display device.

Further, a program according to an embodiment of the present disclosure causes a computer to perform the above-described display method.

Thereby, the above-described computer has the same effect as the above-described display device.

For example, a display device includes: a display unit configured to display an image; a dominant hand information acquisition unit configured to acquire dominant hand information indicating the dominant hand of an operator; an operation detection unit configured to detect designated positions on the display unit that are respectively designated by the index finger and the middle finger of the dominant hand of the operator; an operation analysis unit configured to, when the operation detection unit detects that the two designated positions are moving in parallel in a first region of the display unit, (i) narrow down candidates for the position at which the operator has participated, based on a direction of movement of the two designated positions and the dominant hand information, (ii) determine the position at which the operator has participated, based on a direction of arrangement of the two designated positions and the dominant hand information, and (iii) determine a position of a second region newly generated in the first region and a display direction of an image displayed in the second region, based on the determined position at which the operator has participated; and a display control unit configured to control the display unit to display an image in the second region, according to the position of the second region and the display direction of the image displayed in the second region determined by the operation analysis unit.

Thereby, the display device has the same effect as the above-described display device.

For example, a display device includes: a display unit configured to display an image; an operation detection unit configured to detect designated positions on the display unit that are respectively designated by the index finger and the middle finger of the right hand of an operator; an operation analysis unit configured to, when the operation detection unit detects that the two designated positions are moving in parallel in a first region of the display unit, narrow down candidates for the position at which the operator has participated, based on a direction of movement of the two designated positions, and when the left designated position of the two designated positions, viewed from a candidate for the position at which the operator has participated, is closer to the candidate than the right designated position is, determine the candidate to be the position at which the operator has participated, and determine a position of a second region newly generated in the first region and a display direction of an image displayed in the second region, based on the determined position at which the operator has participated; and a display control unit configured to control the display unit to display an image in the second region, according to the position of the second region and the display direction of the image displayed in the second region determined by the operation analysis unit.

Thereby, the display device has the same effect as the above-described display device.

For example, a display device includes: a display unit configured to display an image; an operation detection unit configured to detect designated positions on the display unit that are respectively designated by the index finger and the middle finger of the left hand of an operator; an operation analysis unit configured to, when the operation detection unit detects that the two designated positions are moving in parallel in a first region of the display unit, narrow down candidates for the position at which the operator has participated, based on a direction of movement of the two designated positions, and when the right designated position of the two designated positions, viewed from a candidate for the position at which the operator has participated, is closer to the candidate than the left designated position is, determine the candidate to be the position at which the operator has participated, and determine a position of a second region newly generated in the first region and a display direction of an image displayed in the second region, based on the determined position at which the operator has participated; and a display control unit configured to control the display unit to display an image in the second region, according to the position of the second region and the display direction of the image displayed in the second region determined by the operation analysis unit.

Thereby, the display device has the same effect as the above-described display device.

Hereinafter, a display device according to an embodiment of the present disclosure will be described in detail with reference to the accompanying drawings.

It should be note that each of the embodiments described below represents a specific example of the present invention. The numerical values, shapes, materials, components, arrangement and connection of components, steps, order of steps and so forth shown in the following embodiments are mere examples, and are not intended to limit the scope of the invention. Of the components in the following embodiments, components not recited in any of the independent claims, which represent the broadest concept, are described as optional components.

Embodiment 1

Hereinafter, a display device 100 according to an aspect of the present disclosure will be described with reference to the accompanying drawings.

Figure 2:
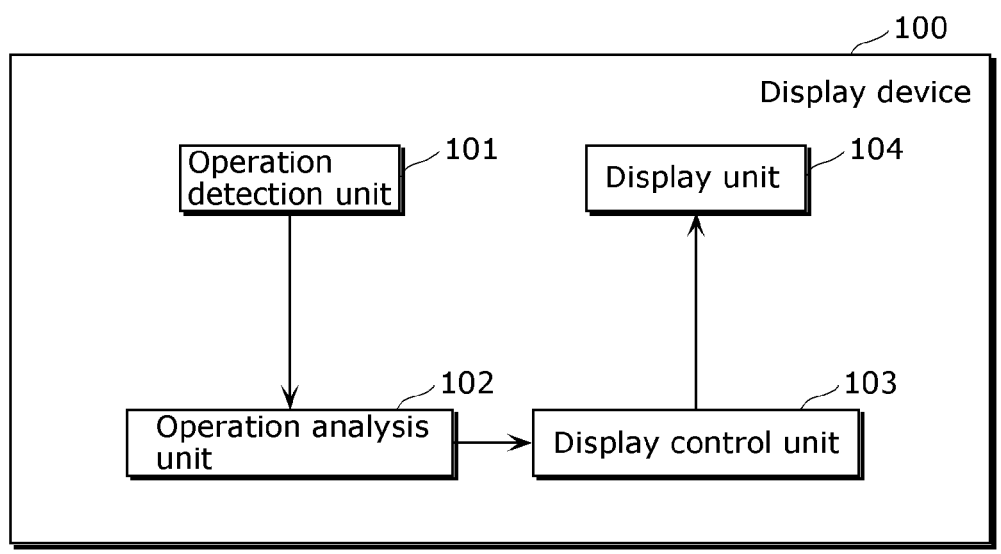
FIG. 2 is a block diagram showing an example of the functional configuration of the display device according to Embodiment 1.

FIG. 1 is a front view showing an example of the external configuration of a display device according to Embodiment 1. FIG. 2 is a block diagram showing an example of the functional configuration of the display device according to Embodiment 1.

As shown in FIGS. 1 and 2, the display device 100 includes an operation detection unit 101, an operation analysis unit 102, a display control unit 103, and a display unit 104.

The operation detection unit 101 detects contact between the screen surface of the display device 100 and fingers of an operator. Upon contact between the fingers of the operator and the screen surface, the operation detection unit 101 generates detection information such as coordinate data of the contact point, and notifies the detection information to the operation analysis unit 102. The operation detection unit 101 may be implemented using a touch panel, for example. Note that the operation detection unit 101 is not limited to detecting direct contact between the screen surface and fingers of the operator, and may detect contact between the screen surface and an object such as a stylus when an operation performed with fingers of the operator is indirectly conveyed to the screen surface via the object.

The operation analysis unit 102 analyzes the number of contact points between fingers of the operator and the screen surface, the direction of movement or the movement distance in the contact state, or the like, based on the detection information generated by the operation detection unit 101. Further, the operation analysis unit 102 determines, from the result of the analysis, the screen splitting position and the image display direction after screen splitting.

The display control unit 103 creates display data, based on information such as the screen splitting position and the image display direction after screen splitting determined by the operation analysis unit 102, and transmits the display data to the display unit 104.

The display unit 104 displays an image based on the image display information transmitted from the display control unit 103. Here, in FIG. 1, a touch panel (not shown) serving as the operation detection unit 101 is disposed in the upper portion of the display unit 104.

Note that specific examples of the display device 100 include a tablet terminal, a large-screen display equipped with a touch panel, a smartphone, and a mobile phone terminal.

Hereinafter, the operation of the display device according to the present embodiment will be described with reference to FIGS. 3 to 6.

Figure 3:
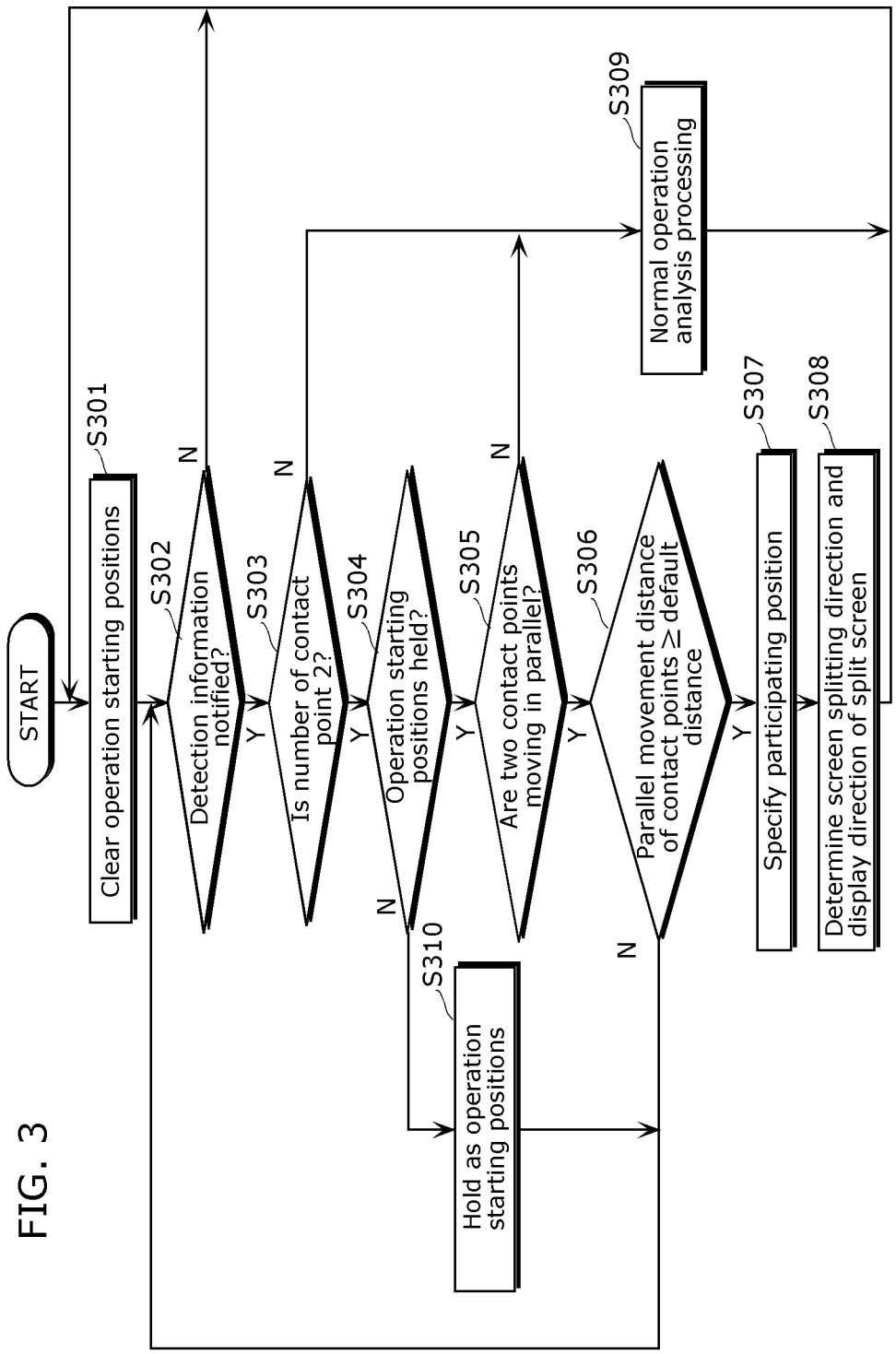
FIG. 3 is a flowchart illustrating processing performed by an operation analysis unit.
Figure 4:
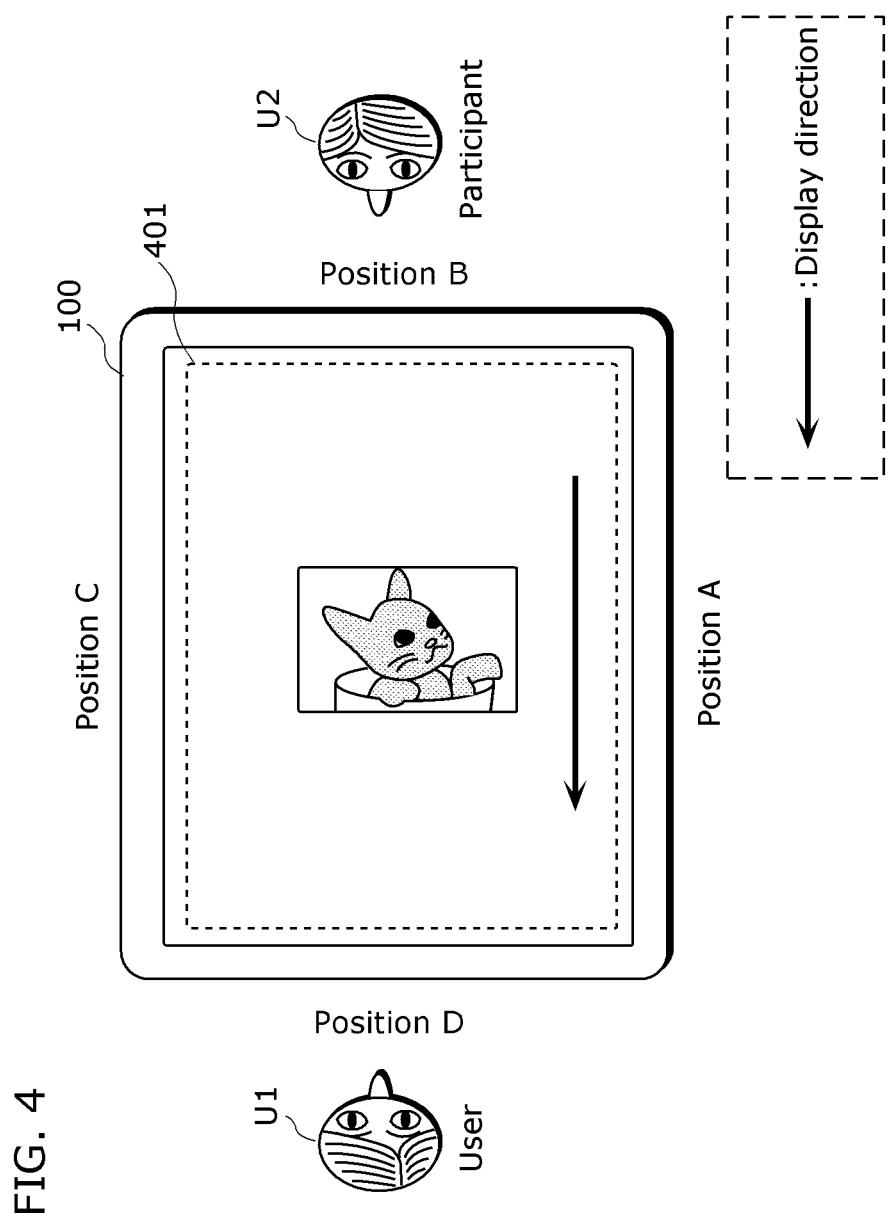
FIG. 4 shows an example of the display device before screen splitting according to Embodiment 1.
Figure 5:
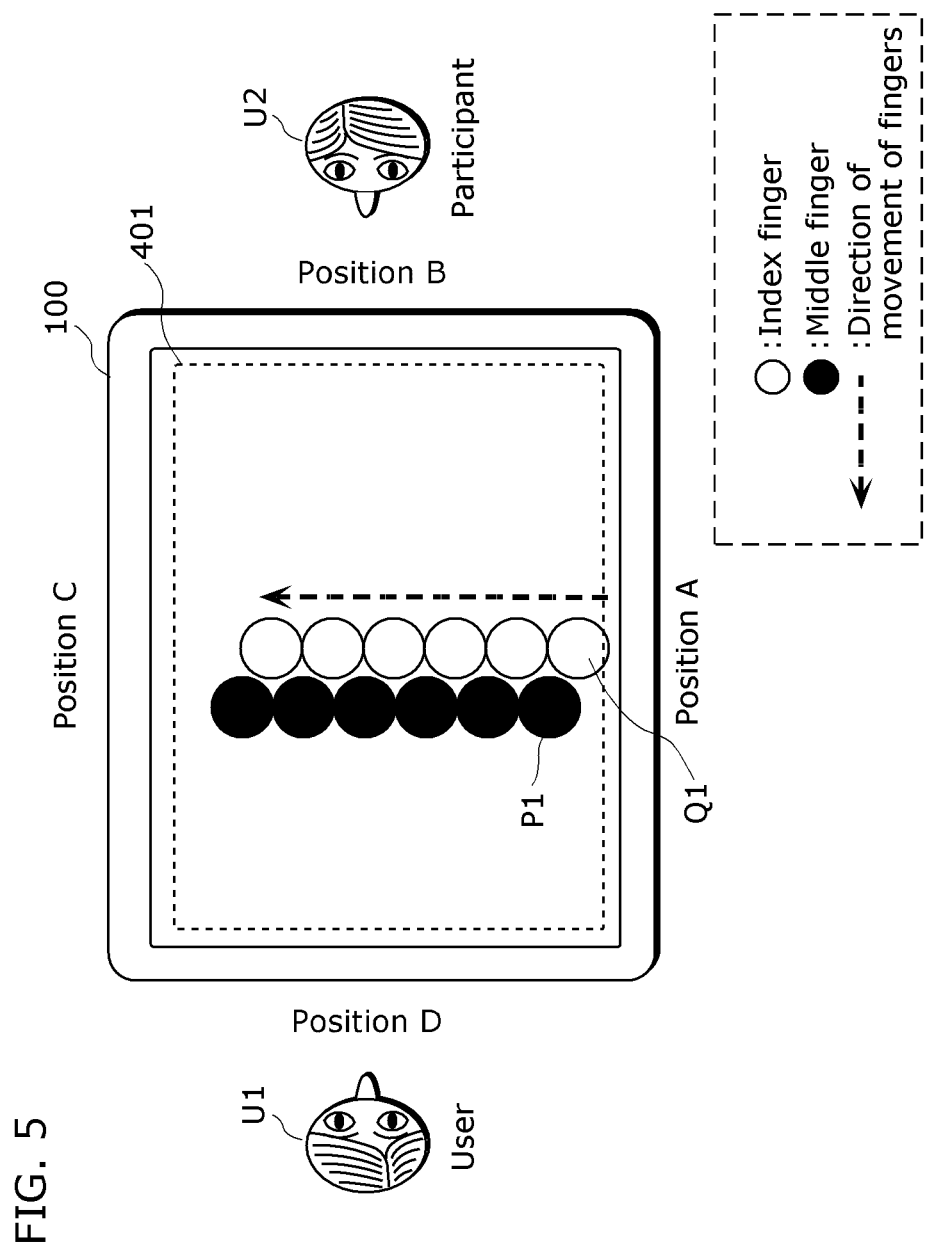
FIG. 5 shows an example of the operation performed by a participant according to Embodiment 1.
Figure 6:
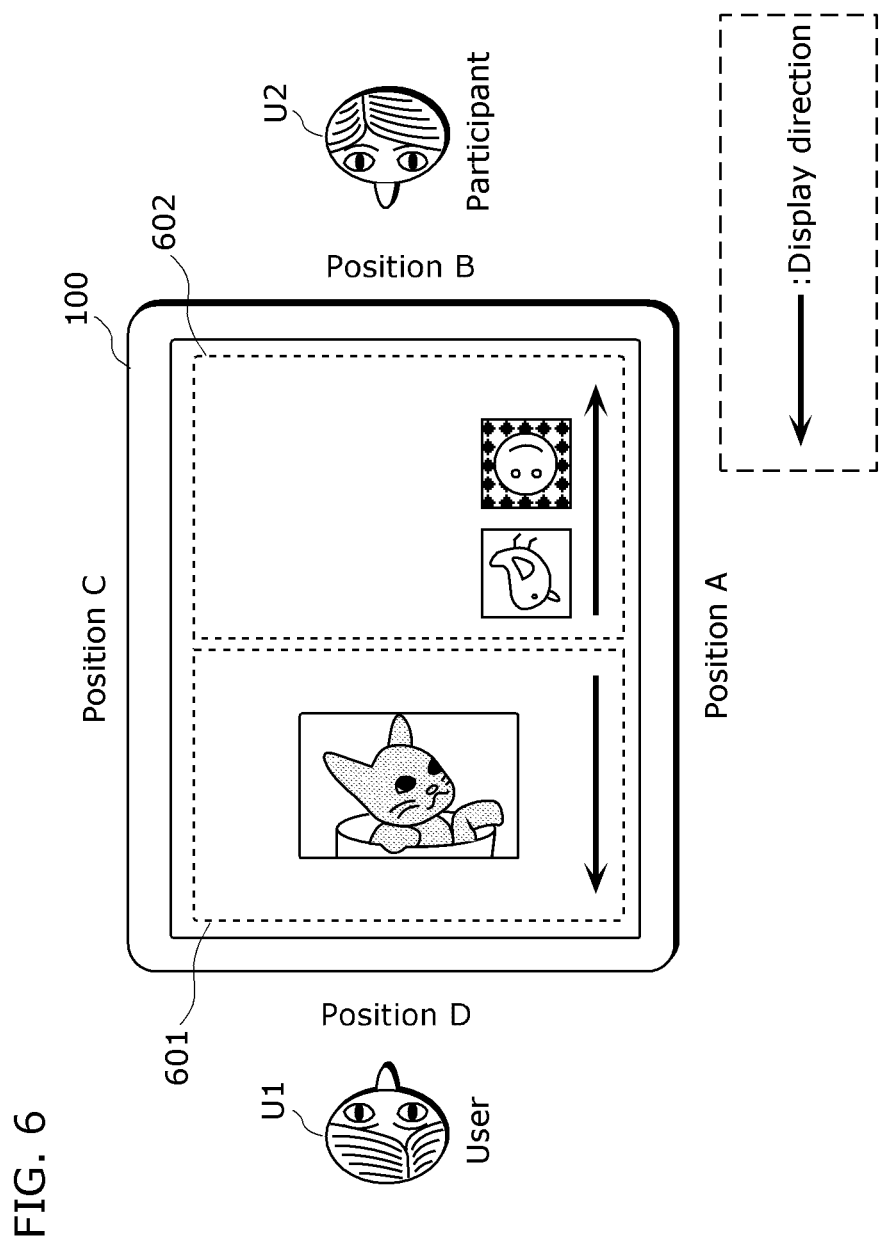
FIG. 6 shows an example of the display device after screen splitting according to Embodiment 1.

FIG. 3 is a flowchart illustrating processing performed by the operation analysis unit 102. FIG. 4 shows a state of the display device before screen splitting according to Embodiment 1. FIG. 5 shows an example of the operation performed by a participant according to Embodiment 1. FIG. 6 shows an example of the display device after screen splitting according to Embodiment 1.

In the present embodiment, a case will be described where, as shown in FIG. 4, the screen is split along a straight line connecting a position A to a position C when a participant U2, who is a new user, participates at a position B while a user U1 is using the display device 100 (a display region 401) at a position D. Also, the splitting operation for splitting the screen is described, taking as an example, an operation performed with two fingers, namely, the index finger and the middle finger, of the participant U2. Note that the above-described splitting operation may be alternatively expressed as newly generating a second region within a first region of the display unit.

The operator specifies a splitting boundary by an intuitive operation of sliding his or her fingers on the display unit along a line serving as a splitting boundary. Here, when splitting the screen vertically, the operation of sliding the fingers along the line serving as the splitting boundary from top to bottom (from the far side to the near side) on the screen as seen from the operator is natural. On the other hand, when splitting the screen horizontally (the far side and the near side), the operation of sliding the fingers in the left-to-right direction on the screen as seen from the operator is natural when the operator is right-handed. When the operator is left-handed, the operation of sliding the fingers in the right-to-left direction on the screen as seen from the operator is natural. The dominant hand of the operator may be pre-set. Alternatively, the operator may be identified, for example, by user authentication and the dominant hand may be determined using predefined dominant hand information of the identified operator.

The present embodiment will now be described in further detail. First, the user U1 is located at the position D before the participant U2 participates. The image display direction is the direction from the center of the screen toward the position D. Here, the image display direction refers to the direction from top to bottom of an image (display content).

Next, as shown in FIG. 5, the participant U2 participates at the position B. The participant U2 brings two fingers (for example, the index finger and the middle finger) into contact with the vicinity of the position A, and moves the two fingers in the direction toward the position C with the two fingers kept in the contact state, thus splitting the screen. In FIG. 5, the open circles indicate the contact positions of the index finger, and the filled circles indicate the contact positions of the middle finger.

The processing for implementing the above-described operation will be described below with reference to the flowchart in FIG. 3.

When the display device 100 is started, for example, by being powered on, the operation analysis unit 102 clears the operation starting positions (Step S301). Upon detecting an operation by the participant, the operation detection unit 101 generates detection information (for example, coordinate data) of the contact points on the screen surface, and notifies the detection information to the operation analysis unit 102.

Next, the operation analysis unit 102, on being notified of the detection information from the operation detection unit 101 (Step S302), analyzes the number of contact points (the number of touched points) on the screen surface from the notified detection information. The operation analysis unit 102 is in a standby state until it is notified of the detection information from the operation detection unit 101.

Next, the operation analysis unit 102 determines whether the number of the contact points is 2 (Step S303). When it is determined that the number of the contact points is 2 (Y in Step S303), the operation analysis unit 102 determines whether the operation starting positions are being held therein (Step S304). When it is determined in Step S304 that the operation starting positions are not held therein (N in Step S304), the operation analysis unit 102 holds the detected two contact points as the operation starting positions (Step S310), and returns to Step S302.

When it is determined in Step S303 that the number of the contact points is not 2 (N in Step S303), the operation analysis unit 102 determines that a normal operation in the display device was performed, rather than a screen splitting operation, and executes normal operation analysis processing (Step S309) before returning to Step S301. Here, when it is determined in Step S303 that the number of the contact points is 0, the operation analysis unit 102 judges that the splitting operation was not completed.

When it is determined in Step S304 that the operation starting positions are being held therein (Y in Step S304), the operation analysis unit 102 determines whether the detected two contact points are moving in parallel (Step S305). Specifically, the operation analysis unit 102 determines that the detected two contact points are moving in parallel when the currently detected contact points are located on the line connecting the operation starting positions and the previous detected points. In this determination, the currently detected contact points may not necessarily be located on the line. In other words, it may be determined that the detected two contact points are moving in parallel when they are located at positions within a predetermined distance from the line connecting the operation starting positions and the previous detected points. Alternatively, it may be determined that the detected two contacts points are moving in parallel when the angle formed between the line connecting the operation starting positions and the previous detected points and the line connecting the operation starting positions and the current detected point are within a predetermined angle. When there are no previous detected points, the operation analysis unit 102 may be configured to determine that the detected two contacts points are moving in parallel.

When it is determined in Step S305 that the detected two contact points are not moving in parallel from the operation starting positions (N in Step S305), the operation analysis unit 102 judges that a normal operation performed with two points simultaneously in contact with the screen surface, such as pinch out, is performed, rather than the screen splitting operation, and executes normal operation analysis processing (Step S309), and thereafter returns to Step S301.

When it is determined in Step S305 that two points are moving in parallel (Y in Step S305), the operation analysis unit 102 compares the parallel movement distance from the starting positions to the detected contact points with a preset default distance (Step S306). When it is judged in Step S306 that the parallel movement distance is smaller than the preset default distance (N in Step S306), the operation analysis unit 102 returns to Step S302.

When it is judged in Step S306 that the parallel movement distance is greater than or equal to the default distance (Y in Step S306), the operation analysis unit 102 judges that the screen splitting operation has been completed, and specifies the position of the participant U2 (Step S307).

Next, the operation analysis unit 102 determines the position of the participant U2 relative to the display device 100. Here, the direction of parallel movement of two points is in the direction from the position A to the position C either in the case where the participant U2 has participated at the position B and moved his or her fingers in parallel from left to right (from the position A to the position C), or in the case where the participant U2 has participated at the position C and moved his or her fingers in parallel from top to bottom (from the position A to the position C). Which of these cases has occurred is determined by the processing shown below.

The operation analysis unit 102 analyzes the positional relationship between (the direction of arrangement of) the operation starting points P1 and Q1 in FIG. 5. Utilizing the difference in length between the index finger and the middle finger, the operation analysis unit 102 determines, when the left side point is closer to a candidate position (candidate for the position at which the participant has participated) than the right side point, as seen from the candidate position, that the candidate position is the participating position. The following describes the determination processing in detail.

Assuming that the candidate position is the position B for FIG. 5, the determination is performed as follows. Since Q1, which is the left side point, is closer to the position B, which is the candidate position, than P1, which is the right side point, as seen from the position B, it is determined that the participant U2 has participated at the position B. At this time, Q1 is the contact position of the index finger and P1 is the contact position of the middle finger, or in other words, the open circles are the contact positions of the index finger and the filled circles are the contact position of the middle finger in FIG. 5.

Assuming that the candidate position is the position C, the determination is performed as follows. Since Q1, which is the left side point, is farther from the position C, which is the candidate position, than P1, which is the right side point, as seen from the position C, it is determined that the position at which the participant U2 has participated is not the position C. Accordingly, this determination is not inconsistent with the determination performed assuming that the candidate position is the position B.

Once the position of the participant U2 has been specified, the operation analysis unit 102 analyzes the relationship between the specified participating position of the participant U2 and the direction in which the fingers were moved for splitting the screen, determines the screen splitting direction and the image display direction on the split screen after screen splitting, and notifies the determined directions as image display direction information to the display control unit 103 (Step S308).

When the screen splitting direction (the direction of movement of the fingers) is the direction from the position A to the position C as shown in FIG. 6, the operation analysis unit 102 determines that the display screen is to be split into a split screen 601 on the position D side and a split screen 602 on the position B side. Since the participating position is the position B, the operation analysis unit 102 determines that the new region generated after splitting is the split screen 602 on the position B side, which is the side closer the participating position, and determines that the screen used before splitting is to be displayed on the split screen 601 on the position D side. Note that the content displayed on the split screen 601 may be a scaled-down version of the content of the screen before splitting, or may be the same size as the original content. Furthermore, whether the content is to be scaled down or is to be the same size as the original content may be determined by an application or by data type. In addition, a screen for the participant may be displayed on the split screen 602. The screen displayed on the split screen 602 may be identical to the screen before splitting.

After determining the participating position and the image display direction of the split screen after splitting, the operation analysis unit 102 determines that the image display direction for display in the new region is the orientation from the position D to the position B and that the image display direction for displaying the screen used on the split screen 601 is the orientation from the position B to the position D, given that the participating position is the position B. The operation analysis unit 102 notifies the determined splitting direction and image display direction on the split screen to the display control unit 103.

The display control unit 103 controls the display unit 104, based on the information on the splitting direction and the image display direction notified from the operation analysis unit 102, to split the screen into two screens located on the position D side and the position B side, respectively, as shown in FIG. 6. Then, the screen is displayed in the direction from the position B to the position D on the split screen 601 on the position D side, and in the direction from the position D to the position B on the split screen 602 on the position B side.

As described above, in the present embodiment, simply performing intuitive screen splitting by the participant using two fingers makes it possible to specify the participating position of the participant from the direction of movement and the positional relationship between the two contact starting points of the two fingers, and display the screen in an appropriate direction after screen splitting.

Although the expression "the screen is split" is used in the present embodiment, this can also be expressed as "a new second region is generated within a first region of the display unit".

As described above, with the display device according to an aspect of the present disclosure, a new operator wanting to use a display device can generate a new display region (second region) in the display region (first region) of that display device through an operation using two or more of his or her fingers. At that time, the display device can direct the orientation of display of the new display region to the direction in which the operator is located, based on the relative positional relationship created between the designated positions by the difference in length of the fingers of the operator and the direction of movement of the designated positions. Accordingly, it is possible to direct the orientation of the display region newly created by the screen splitting operation to the direction in which the operator is located, without a setting or the like of the screen display direction.

Further, the display device, based on the direction of arrangement of the contact positions and the direction of movement of two or more fingers of a new operator wanting to use a display device in an operation performed by the operator, estimates the direction in which the operator is located. Then, the display device determines the display direction of the new display region (second region) so as to be oriented naturally when the display device is used by the operator located in the estimated direction. Accordingly, it is possible to direct the orientation of the display region newly created by the screen splitting operation to the direction in which the operator is located.

Further, the operator can use, as his or her own display region, the display region that he or she is closest to out of the display regions formed after performing a splitting operation. Accordingly, the display region newly created by the screen splitting operation is formed close to the operator, and the operator can use the display region without performing any additional operation such as positional adjustment.

Further, the operation screen for a new operator can be displayed in a new display region (second region) formed close to the new operator. Furthermore, displaying the content that was displayed on the display device (first region) in a region (third region) close to the user that remains after the formation of the new display region allows the user to continue to view his or her own display content in proximity to where he or she is located. Accordingly, the user and the new operator can view their own display regions after the formation of the new display region.

Further, a user is able to continue to use, in the same display direction, the display content that he or she caused the display device (first region) to display before a new operator appears, with the display direction unchanged. Accordingly, the user can continue to use his or her own display region even after the formation of the new display region.

Further, the display content displayed in the display device (first region) by a user before a new operator appears can be displayed in a region (third region) close to the user after a splitting operation is performed. Additionally, the display content displayed in the display device (first region) by a user before a new operator appears can be displayed in a region (second region) close to the new operator after a splitting operation is performed. One of these methods may be used depending on the selection by the user and the new operator.

Further, the screen splitting and the determination of the display direction of an image on a new screen can be performed by an operation performed by parallel movement of two fingers of the operator.

Embodiment 2

In Embodiment 1, a split display method was described for a case where the participant U2 has participated at the position B in a state in which the user U1 is at the position D. In the present embodiment, a case is described where a participant U4 has participated at the position A in a state in which a user U3 is at the position D.

Figure 7:
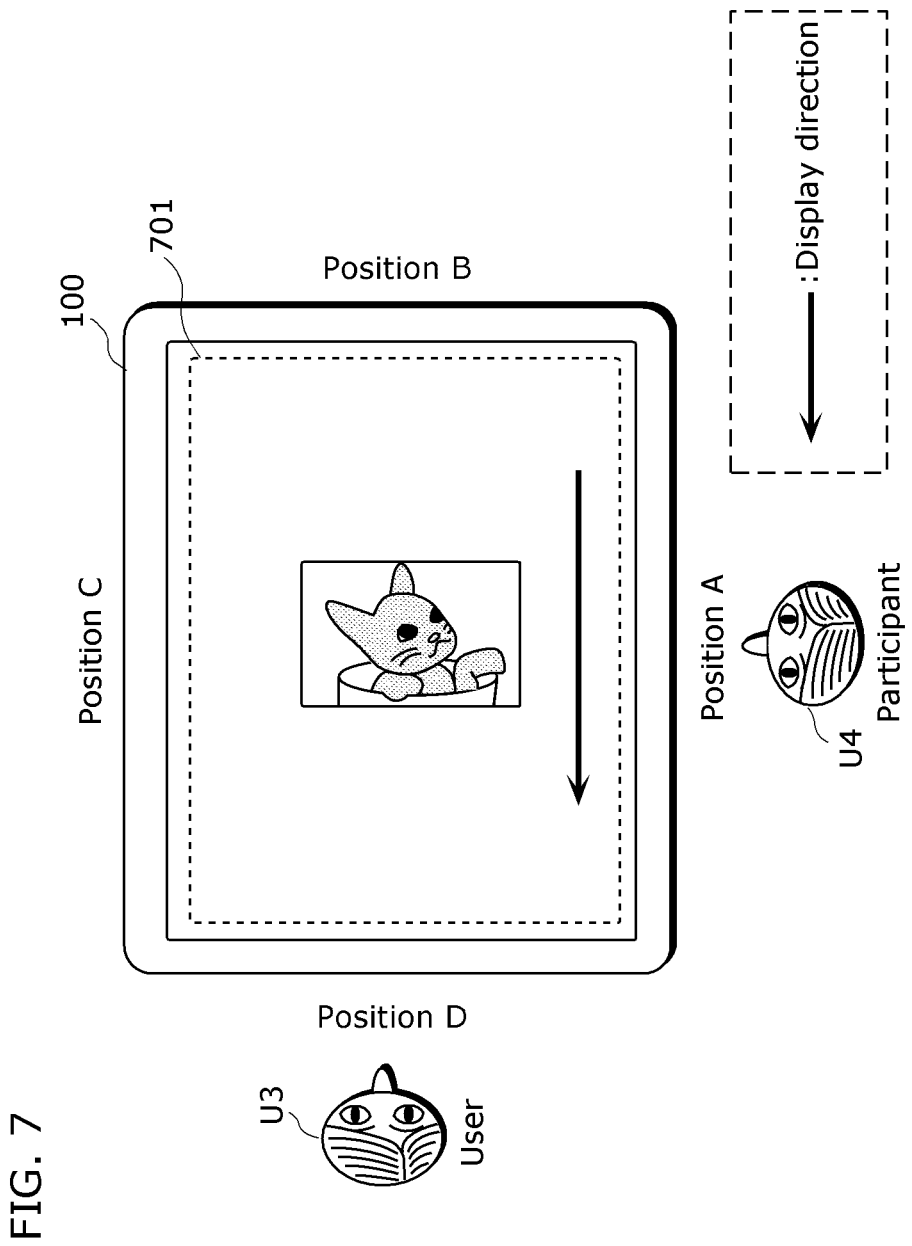
FIG. 7 shows an example of a display device before screen splitting according to Embodiment 2.

In Embodiment 2, a case is described where as shown in FIG. 7, while the user U3 is using the display device 100 (a display region 701) at the position D, the participant U4 participates at the position A and splits the screen in the direction from the position C to the position A.

First, as shown in FIG. 7, prior to participation, the user U3 is located at the position D and the screen is oriented toward the position D. Next, as shown in FIG. 8, the participant U4 participates at the position A and brings two fingers (for example, the index finger and the middle finger) into contact with an area in the vicinity of the position C and then moves the fingers in the direction toward the position A.

By performing the same processing as that in Embodiment 1, the operation detection unit 101 generates detection information when the two fingers come into contact with the screen surface and move thereon, and notifies the detection information to the operation analysis unit 102. The operation analysis unit 102 specifies the position of the participant based on the detection information.

Next, the operation analysis unit 102 determines the position of the participant U4 relative to the display device 100. Here, the direction of parallel movement of two points is in the direction from the position C to the position A either in the case where the participant U4 has participated at the position D and moved his or her fingers in parallel from left to right (from the position C to the position A), or in the case where the participant U4 has participated at the position A and moved his or her fingers in parallel from top to bottom (from the position C to the position A). Which of these cases has occurred is determined by the processing shown below.

Figure 8:
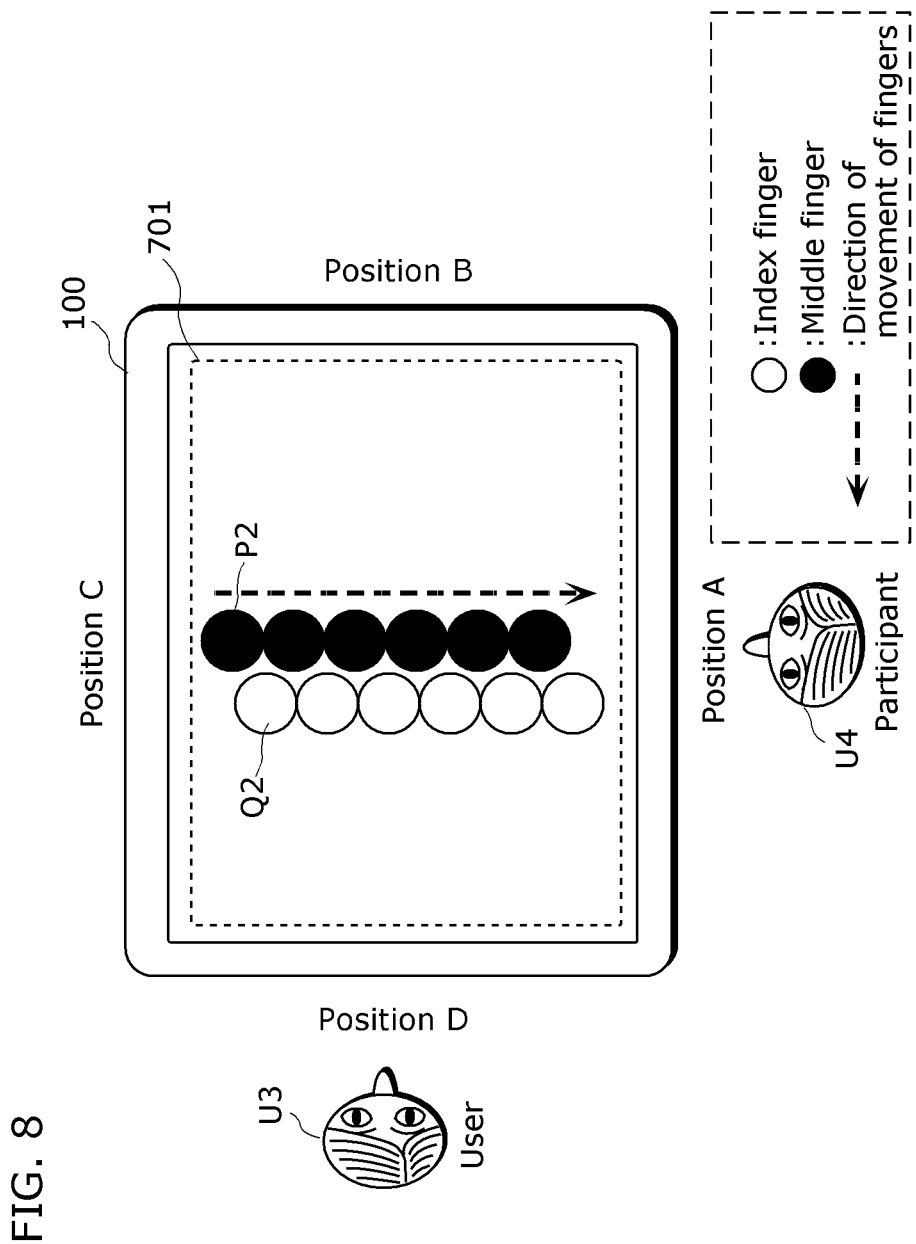
FIG. 8 shows an example of the operation performed by a participant according to Embodiment 2.

The operation analysis unit 102 analyzes the positional relationship between the starting point P2 and the starting point Q2 in FIG. 8. Utilizing the difference in length between the index finger and the middle finger, the operation analysis unit 102 determines, when the left side point is closer to a candidate position than the right side point, as seen from the candidate position, that the candidate position is the participating position. The following describes the determination processing in detail.

For FIG. 8, Q2, which is the left side point, is closer to the position A, which is the candidate position, than P2, which is the right side point, it is determined that the participant U4 has participated at the position A. At this time, P2 is the contact position of the middle finger and Q2 is the contact position of the index finger, or in other words, the open circles are the contact positions of the index finger and the filled circles are the contact position of the middle finger in FIG. 8.

Assuming that the candidate position is the position D, the determination is performed as follows. Since P2, which is the left side point, is farther from the position D, which is the candidate position, than Q2, which is the right side point, as seen from the position D, it is determined that the position at which the participant U4 has participated is not the position D. Accordingly, this determination is not inconsistent with the determination performed assuming that the candidate position is the position A.

Once the position of the participant U4 has been specified, the operation analysis unit 102 analyzes the relationship between the specified participating position of the participant U4 and the direction in which the fingers were moved for splitting the screen, determines the screen splitting direction and the image display direction on the split screen after screen splitting, and notifies the determined directions as image display direction information to the display control unit 103.

Figure 9:
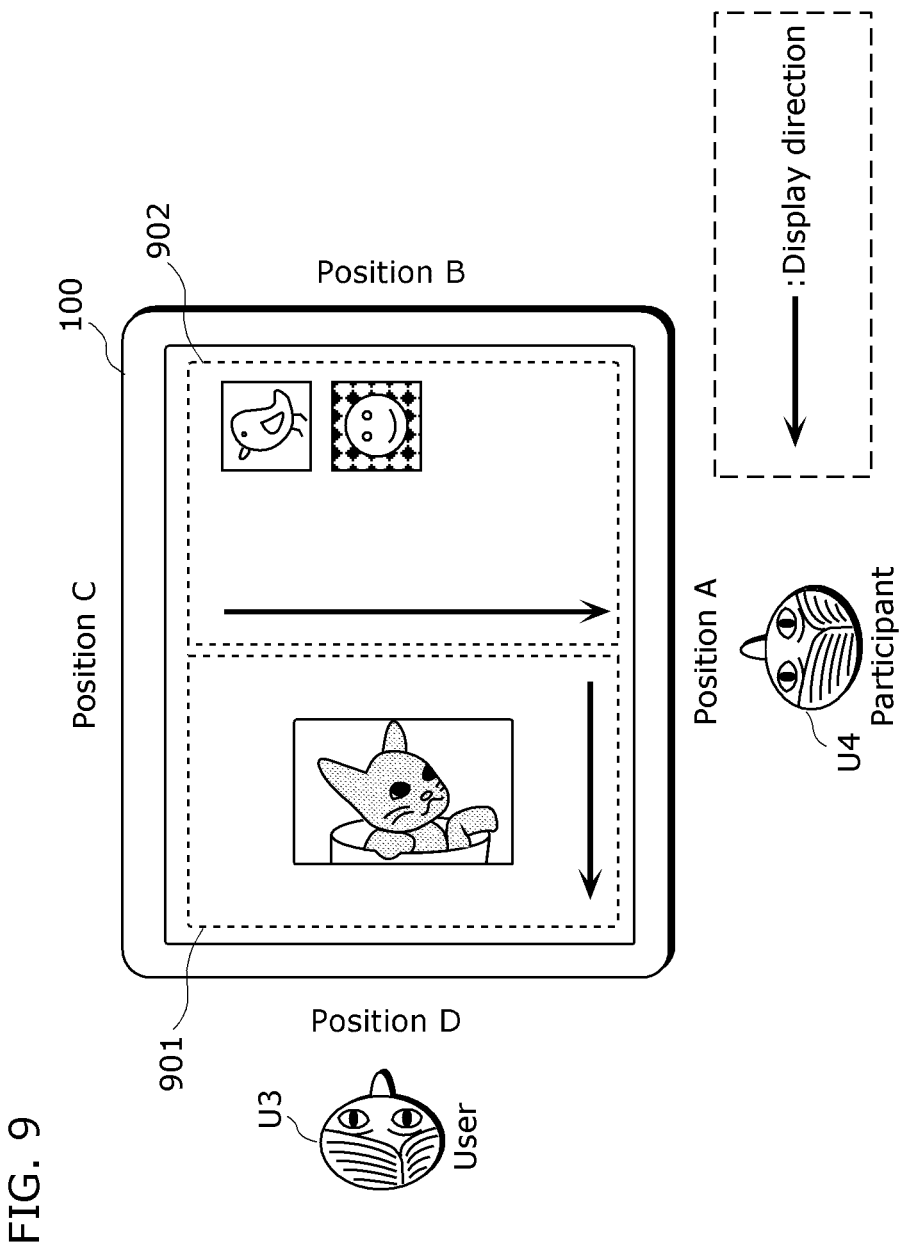
FIG. 9 shows an example of the display device after screen splitting according to Embodiment 2.

When the screen splitting direction (the direction of movement of the fingers) is the direction from the position C to the position A as shown in FIG. 9, the operation analysis unit 102 determines that the display screen is to be split into a split screen 901 on the position D side and a split screen 902 on the position B side. Given that the participating position is the position A, the operation analysis unit 102 determines that the new region generated after splitting is the split screen 902 on the position B side and that the original screen used is to be displayed on the split screen 901 on the position D side.

After determining the participating position and the new region generated after splitting, the operation analysis unit 102 determines that the image display direction for display in the new region is the orientation from the position C to the position A and that the image display direction for displaying the screen used on the split screen 901 is the orientation from the position B to the position D, given that the participating position is the position A. The operation analysis unit 102 notifies the determined splitting direction and image display direction on the split screen to the display control unit 103.

The display control unit 103 controls the display unit 104, based on the information on the splitting direction and the image display direction notified from the operation analysis unit 102, to split the screen into two screens located on the position D side and the position B side side, respectively, as shown in FIG. 9. Then, the screen is displayed in the direction from the position B to the position D on the split screen 901 on the position D side, and in the direction from the position C to the position A on the split screen 902 on the position B side.

As described above, in the present embodiment, simply performing intuitive screen splitting by the participant using two fingers makes it possible to specify the participating position of the participant from the direction of movement and the positional relationship between the two contact starting points of the two fingers, and display the screen in an appropriate direction after screen splitting.

The present embodiment been described, taking as an example, a case where the participant participates at the position A with the user located at the position D. In the case where the participant participates at the position C, split display is also performed by executing the same processing. In this case, in FIG. 8, the positions of the index finger and the middle finger are reversed, and the direction of the fingers is changed to the direction from the position A to the position C, resulting in the image display direction of the split screen 902 after splitting changing to the direction from the position A to the position C.

In the case of the present embodiment, the user is located at the position D, and therefore the position of the participant may be determined as the position A, without considering the possibility that it is the position D.

When it is permissible for the position of the participant to be the same as the position of the user, the image display direction of the split display region will be the same image display direction as the user's screen. For example, in FIG. 9, when the position of the participant is the position D, the image display direction of the split screen 902 will be the same as that of the split screen 901, namely, the direction from the position B to the position D.

Embodiment 3

While Embodiment 1 has been described, taking as an example, a case where the participant participates at a position in front of the user, the present embodiment will be described with regard to examples of other operations and other screen splitting in a case where the participant has participated at a position in front of the user.

Figure 10:
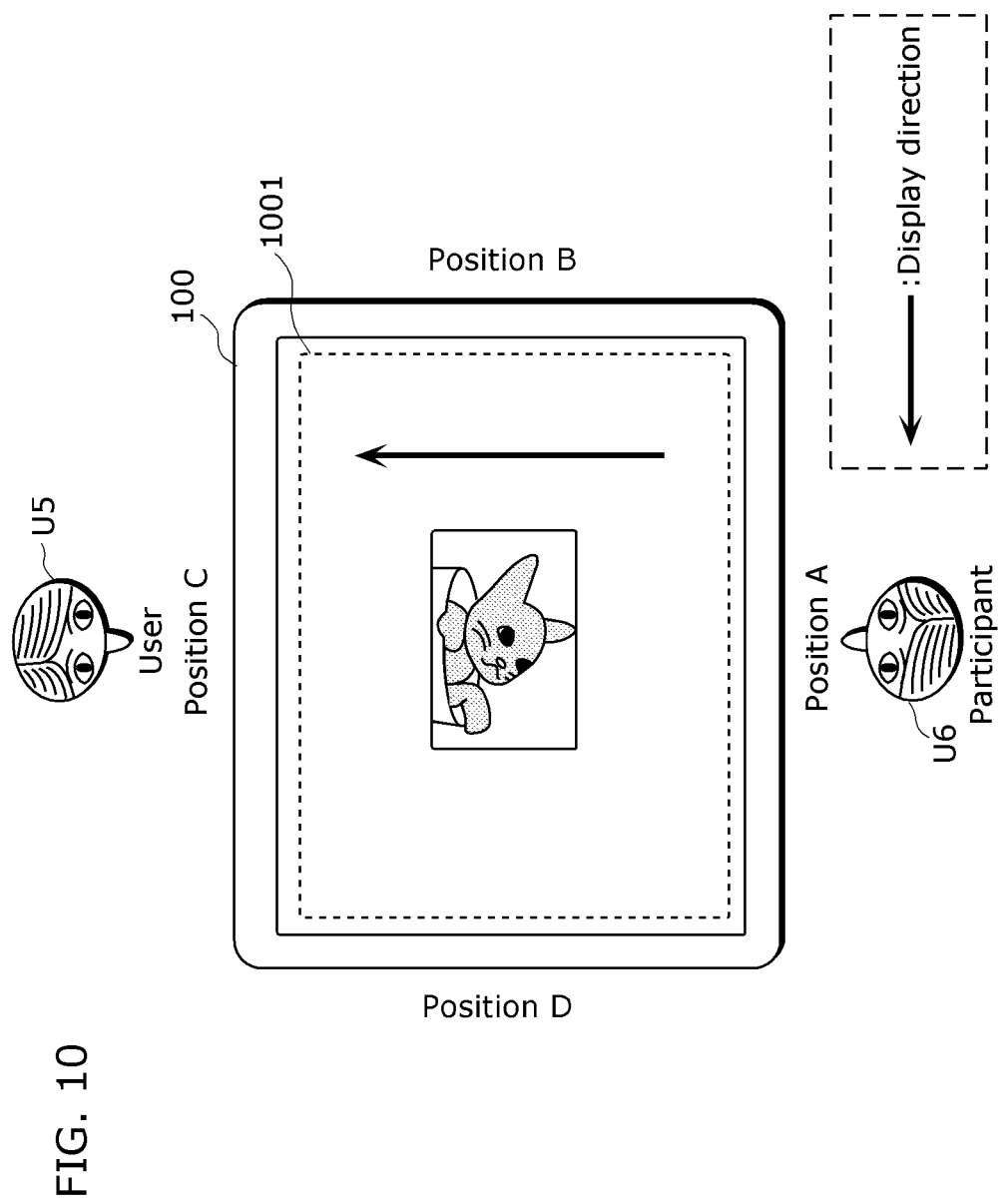
FIG. 10 shows a state of a display device before screen splitting according to Embodiment 3.

Embodiment 3 will be described, taking as an example, a case where, as shown in FIG. 10, a participant U6 has participated at the position A while a user U5 is using the display device 100 (a display region 1001) at the position C, and thus the screen is split in the direction from the position C to the position A. In the present embodiment, a case is considered where the participant U6 has performed a splitting operation using two fingers, namely, the index finger and the middle finger.

Figure 11:
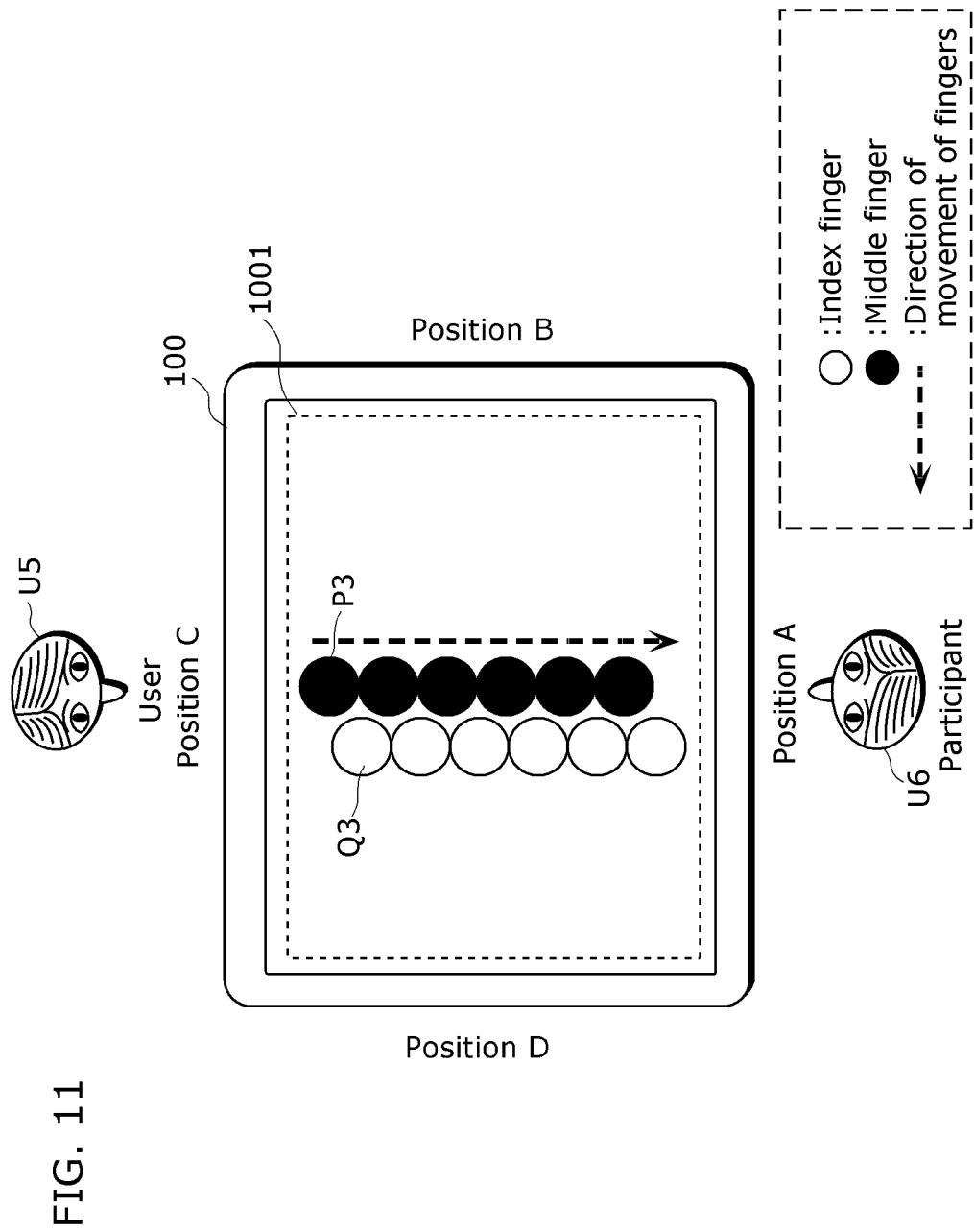
FIG. 11 shows an example of the operation performed by a participant according to Embodiment 3.

First, the user is located at the position C before the participant participates in, and therefore the screen is oriented toward the position C as shown in FIG. 10. Next, as shown in FIG. 11, it is assumed that the participant participates at the position A, brings two fingers (for example, the index finger and the middle finger) into contact with an area in the vicinity of the position C, moves the two fingers in the direction toward in the position A with the two fingers kept in the contact state. Here, the open circles indicate the contact positions of the index finger and the filled circles indicate the contact positions of the middle finger in FIG. 11.

By performing the same processing as that in Embodiment 1, the operation detection unit 101 generates detection information when the two fingers come into contact with the screen surface and move thereon, and notifies the detection information to the operation analysis unit 102. The operation analysis unit 102 specifies the position of the participant based on the detection information.

Next, the operation analysis unit 102 determines the position of the participant U6 relative to the display device 100. Here, the direction of parallel movement of two points is in the direction from the position C to the position A either in the case where the participant U6 has participated at the position D and moved his or her fingers in parallel from left to right (from the position C to the position A), or in the case where the participant U6 has participated at the position A and moved his or her fingers in parallel from top to bottom (from the position C to the position A). Which of these cases has occurred is determined by the processing shown below.

The operation analysis unit 102 analyzes the positional relationship between the starting point P3 and the starting point Q3 in FIG. 11. Utilizing the difference in length between the index finger and the middle finger, the operation analysis unit 102 determines, when the left side point is closer to a candidate position than the right side point, as seen from the candidate position, that the candidate position is the participating position. The following describes the determination processing in detail.

For FIG. 11, assuming that the candidate position is the position A, the determination is performed as follows. Since Q3, which is the left side point, is closer to the position A, which is the candidate position, than P3, which is the right side point, as seen from the position A, it is determined that the participant U6 has participated at the position A. At this time, P3 is the contact position of the middle finger and Q3 is the contact position of the index finger, or in other words, the open circles are the contact positions of the index finger and the filled circles are the contact position of the middle finger in FIG. 11.

Assuming that the candidate position is the position D, the determination is performed as follows. Since P3, which is the left side point, is farther from the position D, which is the candidate position, than Q3, which is the right side point, as seen from the position D, it is determined that the position at which the participant U6 has participated is not the position D. Accordingly, this determination is not inconsistent with the determination performed assuming that the candidate position is the position A.

Once the position of the participant U6 has been specified, the operation analysis unit 102 analyzes the relationship between the specified participating position of the participant U6 and the direction in which the fingers were moved for splitting the screen, determines the screen splitting direction and the image display direction on the split screen after screen splitting, and notifies the determined directions as image display direction information to the display control unit 103.

Figure 12:
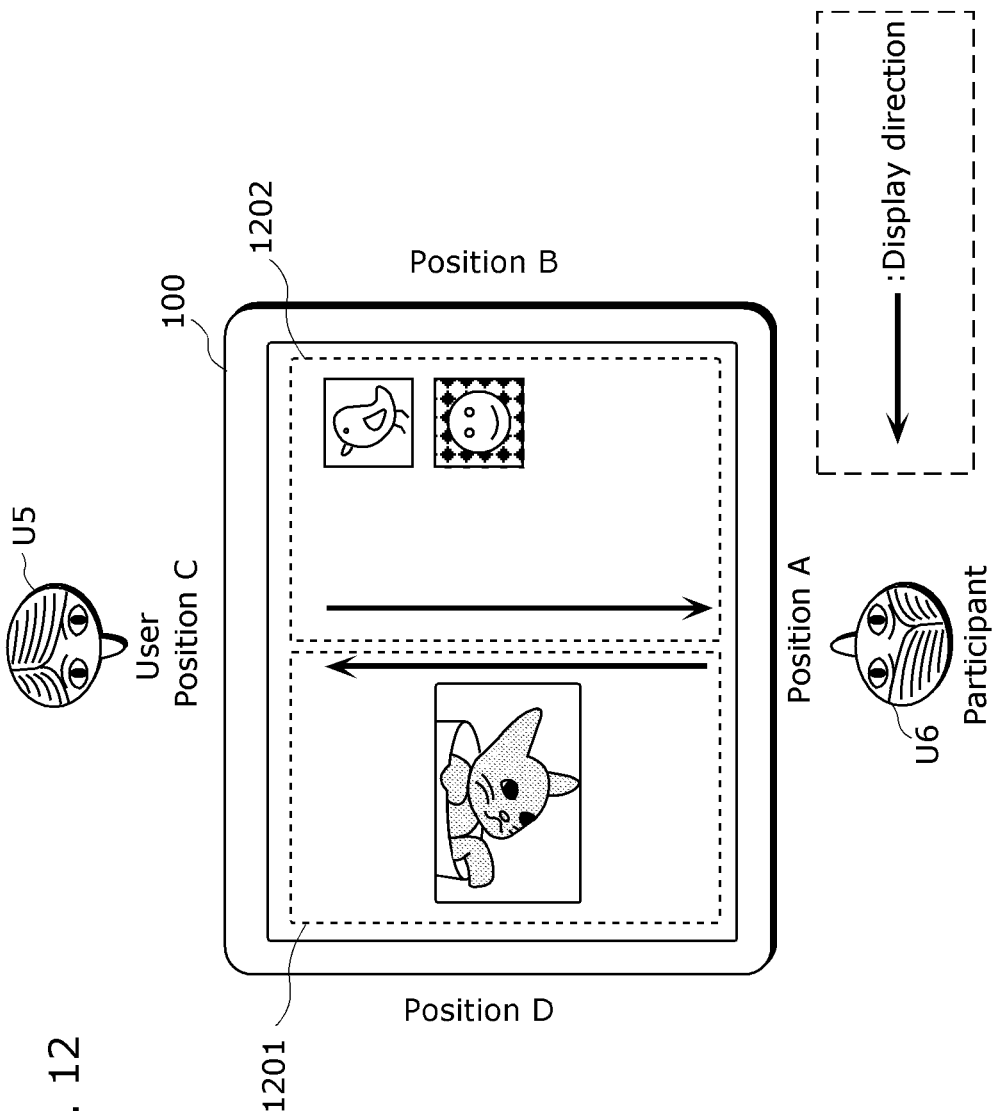
FIG. 12 shows an example of the display device after screen splitting according to Embodiment 3.

When the screen splitting direction (the direction of movement of the fingers) is the direction from the position C to the position A as shown in FIG. 12, the operation analysis unit 102 determines that the display screen is to be split into a split screen 1201 on the position D side and a split screen 1202 on the position B side. In this case, the new region generated after splitting is the split screen 1202 on the position B side, and the operation analysis unit 102 determines that the original screen that was used is to be displayed on the split screen 1201 located on the position D side. Note that the new region generated after splitting may be the split screen 1201, and the operation analysis unit 102 may determine that the original screen that was used to be displayed on the split screen 1202.

After determining the participating position and the new region generated after splitting, the operation analysis unit 102 determines that the image display direction for display in the new region is the orientation from the position C to the position A and that the image display direction for displaying the screen used on the split screen 1201 is the orientation from the position A to the position C, given that the participating position is the position A. The operation analysis unit 102 notifies the determined splitting direction and image display direction on the split screen to the display control unit 103.

The display control unit 103 controls the display unit 104, based on the information on the splitting direction and the image display direction notified from the operation analysis unit 102, to split the screen into two screens located on the position D side and the position B side, respectively, as shown in FIG. 12. After splitting, the screen is displayed in the direction from the position A to the position C on the split screen 1201 on the position D side, and in the direction from the position C to the position A on the split screen 1202 on the position B side.

Figure 13:
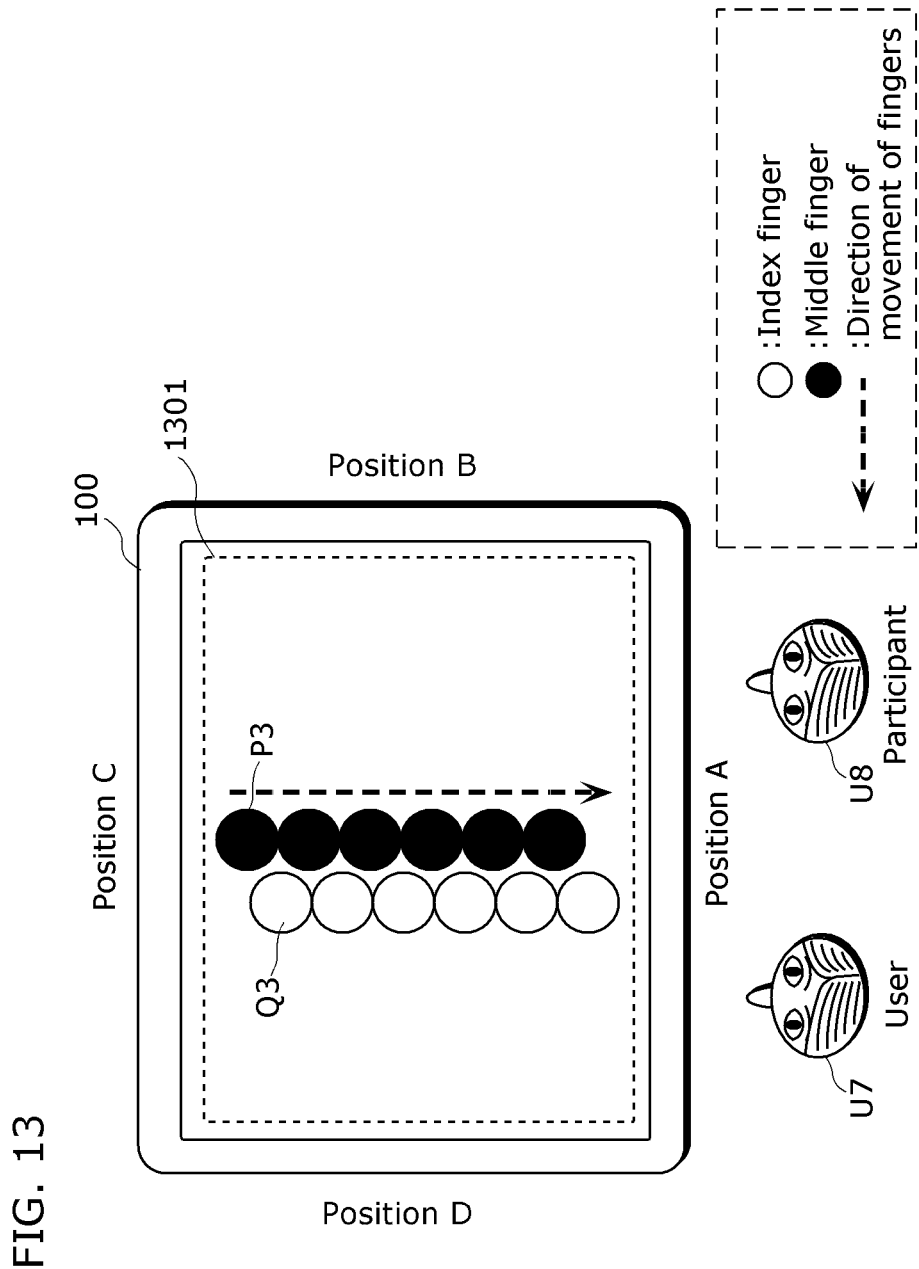
FIG. 13 shows another example of the operation performed by a participant according to Embodiment 3.

As shown in FIG. 13, it is possible that a participant U8 participates at the position A, which is on the same side as a user U7, relative to the display device 100 (a display region 1301). In this case, the participant U8 splits the screen in the direction from the position C to the position A. The operation performed with the fingers of the participant and the processing for recognizing that operation are the same as those described above.

In this way, a new region for the participant U8 is formed as shown in FIG. 14. That is, the display screen is split into a split screen 1401 on the position D side and a split screen 1402 on the position B side. The image display direction of the screen 1402 after screen splitting is toward the position of the participant U8.

In such a case, on which of the split screen 1401 on the position D side and the split screen 1402 on the position B side is the screen for the user to be displayed (on which of the split screens is the screen for the participant to be displayed) may be set in advance, and the determination may be made according to that setting.

As described above, simply performing intuitive screen splitting by the participant using two fingers makes it possible to specify the participating position of the participant from the direction of movement and the positional relationship between the two contact starting points of the two fingers, and display the screen in an appropriate direction after screen splitting.

Although each of the embodiments is described, taking as an example, the case where two fingers, namely, the index finger and the middle finger are used as the fingers for splitting the screen, it is possible to use a different two fingers, or two or more fingers. The position of the participant can also be specified from the positional relationship between the fingers in the case of using a different two fingers, or two ore more fingers.

In the case of using two or more fingers, the position of the participant may be specified from the position of two of the fingers.

With regard to cancellation of screen splitting, the screen splitting may be cancelled by performing the same operation as that performed during screen splitting, or in other words, by moving two or more fingers along the vicinity of the boundary of the split screens in the same direction as that used during screen splitting. Alternatively, screen splitting may be cancelled by moving the fingers in the opposite direction from the direction during screen splitting. A method other than these may be used as the cancellation operation method.

Any device including a display unit capable of displaying an image may be used as the display device according to the embodiments.

In each of the above-described embodiments, each of the components may be configured with dedicated hardware, or alternatively, may be implemented by executing a software program suitable for the component. Each of the components may be implemented with a program executing unit such as a CPU or processor reading and executing a software program stored in a recording medium such as a hard disk or a semiconductor memory. Here, the software that implements the display device and the like according to each of the above-described embodiments may be the following program.

That is, the program causes a computer to execute: a display method in a display device including a display unit configured to display an image, the method including: detecting designated positions on the display unit that are respectively designated by two or more fingers of an operator; determining, when it is detected in the detecting that the designated positions are moving in parallel in a first region of the display unit, a position of a second region newly generated in the first region and a display direction of an image displayed in the second region, based on the designated positions and a direction of movement of the designated positions; and controlling the display unit to display an image in the second region, according to the position of the second region and the display direction of the image displayed in the second region determined in the determining.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The display device according to the present disclosure is useful when a plurality of operators use a single terminal.

The invention claimed is:
1. A display device comprising:
a display unit configured to display an image;
a dominant hand information acquisition unit configured to acquire dominant hand information indicating the dominant hand of an operator;
an operation detection unit configured to detect designated positions on the display unit that are respectively designated by the index finger and the middle finger of the dominant hand of the operator;

an operation analysis unit configured to, when the operation detection unit detects that the two designated positions are moving in parallel in a first region of the display unit, (i) narrow down candidates for the position at which the operator has participated, based on a direction of movement of the two designated positions and the dominant hand information, (ii) determine the position at which the operator has participated, based on a direction of arrangement of the two designated positions and the dominant hand information, and (iii) determine a position of a second region newly generated in the first region and a display direction of an image displayed in the second region, based on the determined position at which the operator has participated; and a display control unit configured to control the display unit to display an image in the second region, according to the position of the second region and the display direction of the image displayed in the second region determined by the operation analysis unit.

2. The display device according to claim 1,
wherein the operation analysis unit is configured to, based on a direction of arrangement and the direction of movement of the two designated positions, estimate a direction in which the operator is located as seen from the display device, and determine the direction as the display direction of the image displayed in the second region.

3. The display device according to claim 1,
wherein the operation analysis unit is configured to, based on a direction of arrangement and the direction of movement of the two designated positions, estimate a direction in which the operator is located as seen from the display device, and determine, as the position of the second region, whichever of the regions formed by the first region being split by a line corresponding to a trajectory of the designated positions is closest to the operator.

4. The display device according to claim 1,
wherein the display control unit is configured to display an image displayed in the first region, in a third region that is located within the first region and is not included in the second region, and to display an image for the operator in the second region.

5. The display device according to claim 4,
wherein the display control unit is configured to determine a direction matching the display direction of the image displayed in the first region as a display direction of the image displayed in the third region.

6. The display device according to claim 4,
wherein the display control unit is configured to display, in at least one of the second region and the third region, the image displayed in the first region.

7. The display device according to claim 1,
wherein the operation analysis unit is configured to, when it is detected that the two designated positions are moving in parallel in the first region, determine a position of the second region and a display direction of an image displayed in the second region, based on the two designated positions and a direction of arrangement and the direction of movement of the two designated positions.

8. A display method in a display device including a display unit configured to display an image, the method comprising:
acquiring dominant hand information indicating the dominant hand of an operator;
detecting designated positions on the display unit that are respectively designated by the index finger and the middle finger of the dominant hand of the operator;

when it is detected in the detecting that the two designated positions are moving in parallel in a first region of the display unit, (i) narrowing down candidates for the position at which the operator has participated, based on a direction of movement of the two designated positions and the dominant hand information, (ii) determining the position at which the operator has participated, based on a direction of arrangement of the two designated positions and the dominant hand information, and (iii) determining a position of a second region newly generated in the first region and a display direction of an image displayed in the second region, based on the determined position at which the operator has participated; and
controlling the display unit to display an image in the second region, according to the position of the second region and the display direction of the image displayed in the second region determined in the determining (iii).

9. A non-transitory computer-readable recording medium for use in a computer, the recording medium having a computer program recorded thereon for causing the computer to execute the display method according to claim 8.

10. A display device comprising:
a display unit configured to display an image;
an operation detection unit configured to detect designated positions on the display unit that are respectively designated by the index finger and the middle finger of the right hand of an operator;
an operation analysis unit configured to, when the operation detection unit detects that the two designated positions are moving in parallel in a first region of the display unit, narrow down candidates for the position at which the operator has participated, based on a direction of movement of the two designated positions, and when the left designated position of the two designated positions, viewed from a candidate for the position at which the operator has participated, is closer to the candidate than the right designated position is, determine the candidate to be the position at which the operator has participated, and determine a position of a second region newly generated in the first region and a display direction of an image displayed in the second region, based on the determined position at which the operator has participated; and
a display control unit configured to control the display unit to display an image in the second region, according to the position of the second region and the display direction of the image displayed in the second region determined by the operation analysis unit.

11. A display device comprising:
a display unit configured to display an image;
an operation detection unit configured to detect designated positions on the display unit that are respectively designated by the index finger and the middle finger of the left hand of an operator;
an operation analysis unit configured to, when the operation detection unit detects that the two designated positions are moving in parallel in a first region of the display unit, narrow down candidates for the position at which the operator has participated, based on a direction of movement of the two designated positions, and when the right designated position of the two designated positions, viewed from a candidate for the position at which the operator has participated, is closer to the candidate than the left designated position is, determine the candidate to be the position at which the operator has participated, and determine a position of a second region newly generated in the first region and a display direction of an image displayed in the second region, based on the determined position at which the operator has participated; and a display control unit configured to control the display unit to display an image in the second region, according to the position of the second region and the display direction of the image displayed in the second region determined by the operation analysis unit.

* * * * *